Sept. 4, 1962 L. M. CURTISS 3,052,748
ELECTRIC CONNECTOR FOR INTERLOCKING ARMOR CABLE
Filed Dec. 17, 1958 6 Sheets-Sheet 1

Fig. 1

INVENTOR.
LAWRENCE M. CURTISS
BY
ATTORNEY.

Sept. 4, 1962 L. M. CURTISS 3,052,748
ELECTRIC CONNECTOR FOR INTERLOCKING ARMOR CABLE
Filed Dec. 17, 1958 6 Sheets-Sheet 3

INVENTOR.
LAWRENCE M. CURTISS
BY
ATTORNEY.

Sept. 4, 1962   L. M. CURTISS   3,052,748
ELECTRIC CONNECTOR FOR INTERLOCKING ARMOR CABLE
Filed Dec. 17, 1958   6 Sheets-Sheet 5

INVENTOR.
LAWRENCE M. CURTISS
BY
ATTORNEY.

INVENTOR.
LAWRENCE M. CURTISS

BY John Babir Jr.

ATTORNEY

United States Patent Office 3,052,748
Patented Sept. 4, 1962

3,052,748
ELECTRIC CONNECTOR FOR INTERLOCKING ARMOR CABLE
Lawrence M. Curtiss, Mountainside, N.J., assignor to The Thomas & Betts Co., Elizabeth, N.J., a corporation of New Jersey
Filed Dec. 17, 1958, Ser. No. 781,092
15 Claims. (Cl. 174—51)

The invention relates to interlocked armor cable installations, and more particularly to a connector fitting for use in such installations which is primarily adapted for selectively terminating, supporting, suspending, bracing and grounding such armored cables between junction boxes, transmission towers, standards, or fixed apertured panels, or on or from the interior or exterior surfaces of buildings, tunnels, shafts, ramps and the like.

More specifically, the invention resides in a connector fitting which includes complementary elements and/or interchangeable accessories which may be selectively arranged on the connector fitting or parts thereof for either suspending interlocked armor cable from steel messenger cables, hanger rods or the like, or directly securing the connector fitting to ceilings, walls or other fixed horizontal or vertical surfaces, bracing sections of such armored cable against sag between such connector fittings, and for grounding the armored cable by means of a suitable cable conductor secured thereto in spaced parallelism therewith, all in addition to terminating or securing the interlocked armor of such cables in junction boxes or fixed apertured panels and the like in conventional manner.

Known devices for installing interlocked armor cable lengths in the manner herein mentioned, possessed certain disadvantages in that such installations required a relatively larger amount of material in the form of cable troughs, racks, ladders, crosses, T's, clamps, insulator blocks, protective cages, pull boxes and conduit type ground fittings etc. Thus, such installations were complicated, expensive, not adapted for readily passing fixed obstructions such as pillars, columns, bulkheads, etc., or for subsequently adding additional cable lengths thereto or removing cables therefrom without disturbing the original installation. Moreover, in such installations, the interlocked armor cable lengths were free to kink, shift, vibrate and to impose strains on their terminal connections.

Accordingly, it is an object of the invention to provide a connector fitting assembly adapted for installing interlocked armor cable, which obviates the aforesaid disadvantages.

A further object of the invention is to provide a universal connector fitting for interlocked armor cables which affords greater economy, flexibility and versatility in the installation thereof within or on the exterior of buildings and the like.

Another object of the invention is to provide a connector fitting assembly for installing interlocked armor cable lengths in the manner specified in which the interlocked armor of the cable is utilized to support the same in conjunction with the connector fittings carrying each cable length.

A further object of the invention is to provide a connector fitting assembly for installing interlocked armor cable lengths in which installation the cable lengths are each lifted into place instead of being drawn through supporting trays, racks or the like.

Another object of the invention is to provide a connector fitting assembly for installing interlocked armor cable lengths which provides for the simple, safe and economical grounding of such cable by means of a continuous ground wire running outside of the interlocked armor cable in spaced parallelism therewith.

Another object of the invention is to provide a connector fitting assembly for installing interlocked armor cable lengths which provides for the grounding of such cable at only one point thereon, as in electric generating stations, and which reduces voltage drop between two or more such cables by virtue of uniform space therebetween.

A further object of the invention is to provide a connector fitting assembly adapted for installing interlocked armor cable lengths, which facilitates "downtime" when subsequent changes in high voltage power circuits require additional cable or a reduction in installed cable.

Another object of the invention is to provide a universal connector fitting adapted for installing interlocked armor cable within or on the exterior of buildings or the like which greatly reduced installation time and cost of material, requires a minimum space, permits the installation of longer cable sections without the use of troughs, racks, ladders, etc., and facilitates the bending of such cable sections around corners and fixed obstructions without the use of conduit bends and associated pull boxes.

A further object of the invention is to provide a universal connector fitting whereby an end portion of an interlocked armor cable section may be secured in an apertured wall of an outlet box or the like or on the interior or exterior of a building or the like, for selectively supporting such cable in either a vertical or horizontal position.

Another object of the invention is to provide a universal connector fitting whereby interlocked armor cable may be selectively terminated in a "dead end" disposed in either a vertical or horizontal position, and grounded at a single point thereon by means of a conductor mounted thereon in spaced parallelism, and the free end of the body of the connector fitting rendered watertight by means of a gland nut provided with an insulated bushing, or provided with a pothead for the reception of a sealing compound, whereby to seal exposed insulated cable end portions, extending beyond the interlocked armor, through the pothead.

A further object of the invention is to provide a connector fitting of the character described wherein the crests of the spiral groove formed in the inner periphery of each saddle clamp seat on the interlocked armor cable between its raised spiral convolutions whereby the interlocked armor is constricted on the enclosed conductors to prevent endwise movement of the cable proper within its interlocked armor.

Another object of the invention is to provide a universal connector fitting comprising a plurality of elements provided with complementary means, whereby such elements may be selectively connected and/or arranged in a plurality of different positions of angular adjustment in either a vertical or horizontal plane.

With the above and other objects in view, the invention resides in the novel construction, combination and arrangement of parts, the novel features of which are set forth with particularity in the appended claims, the invention itself, however, both as to its organization and method of operation, together with additional objects and advantages thereof, being best understood from the following description of a specific embodiment thereof, when taken in connection with the accompanying drawings, in which:

Referring to the drawings wherein similar reference characters indicate corresponding parts throughout, the herein described cable connector assembly 20 comprises an externally screw-threaded annular member 22, having an annular hexagonal flange 24 at one end square therewith, and a pair of diametrically opposite arms 26, of rectangular configuration in cross section, extending at right angles from the outer face of the annular flange 24, with their top and bottom faces disposed in a plane normal thereto, and each provided with a pair of screw-threaded openings 28 therethrough, for a purpose presently to be described.

Figure 1:
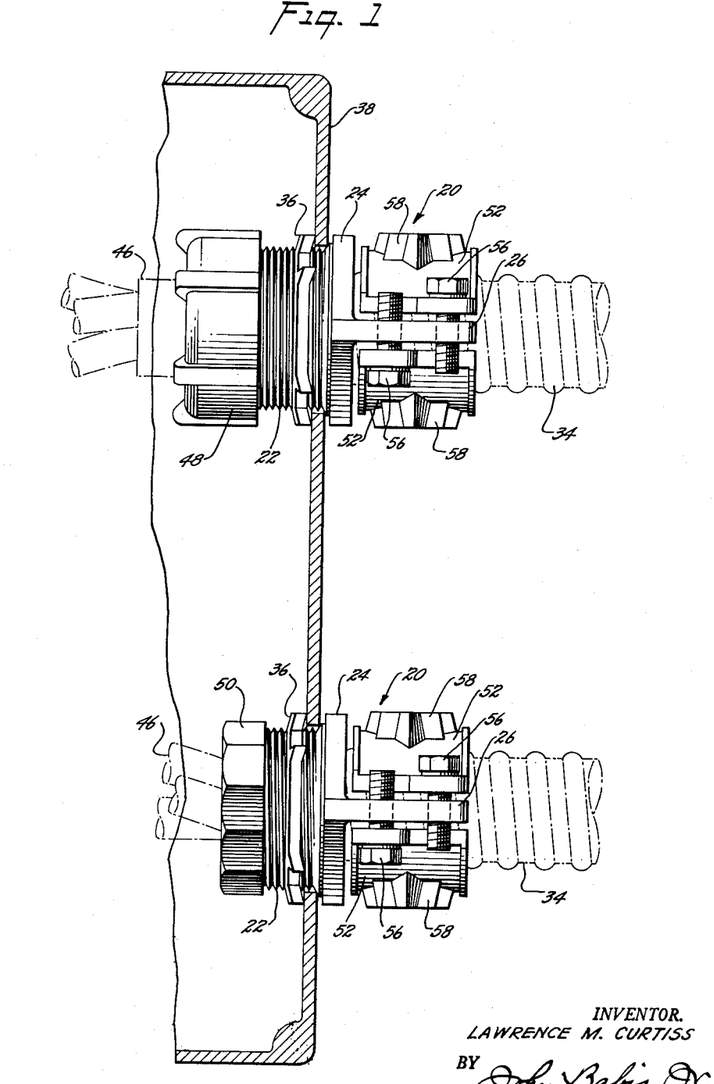
FIG. 1 is an elevational view partly in section illustrating a pair of connector fittings as utilized to secure a terminal end of each of a pair of interlocked armor cable sections in an apertured wall of an outlet box with a water-tight gland nut secured on the intruded free end of the upper connector fitting, and an insulated bushing secured on the intruded free end of the lower connector fitting.
Figure 2:
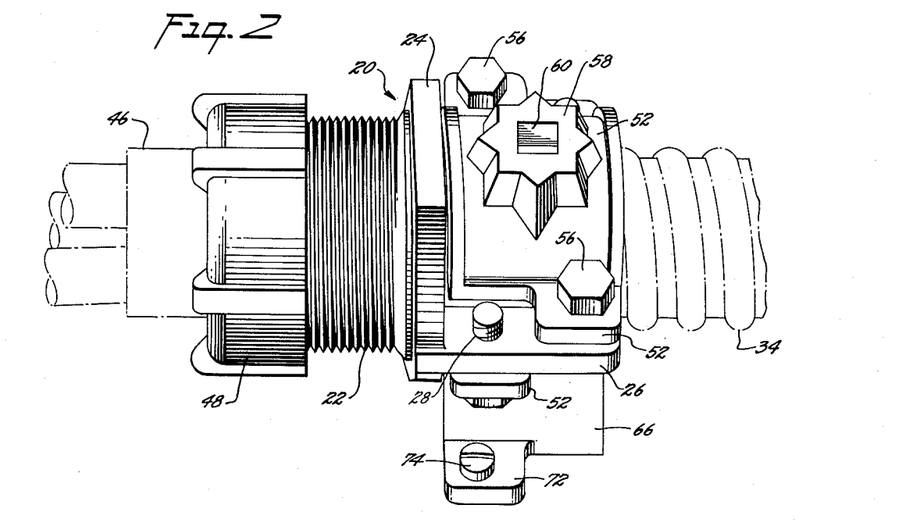
FIG. 2 is a top plan view partly in perspective showing the subject connector fitting including a watertight gland nut, and a complementary mounting bracket secured on an end portion of an interlocked armor cable, whereby to secure the cable to a fixed surface in either vertical or horizontal position.
Figure 5:
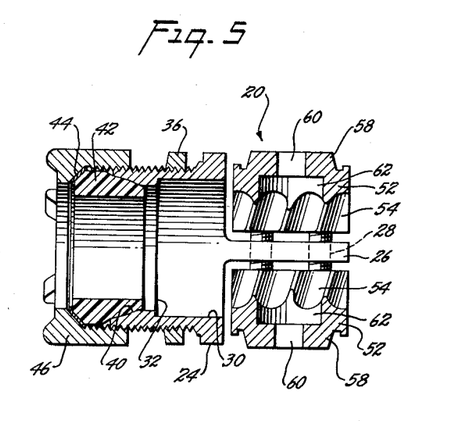
FIG. 5 is a sectional view taken on the line 5—5 of FIG. 4, showing the body of the connector including a gland nut on one end thereof, and a pair of complementary saddle clamps mounted in floating relation on its opposite end, the saddle clamps being each provided with a complementary spiral groove adapted to receive the convex convolutions of interlocked cable armor in matching relation.
Figures 6, 7, 8, 9, 10:
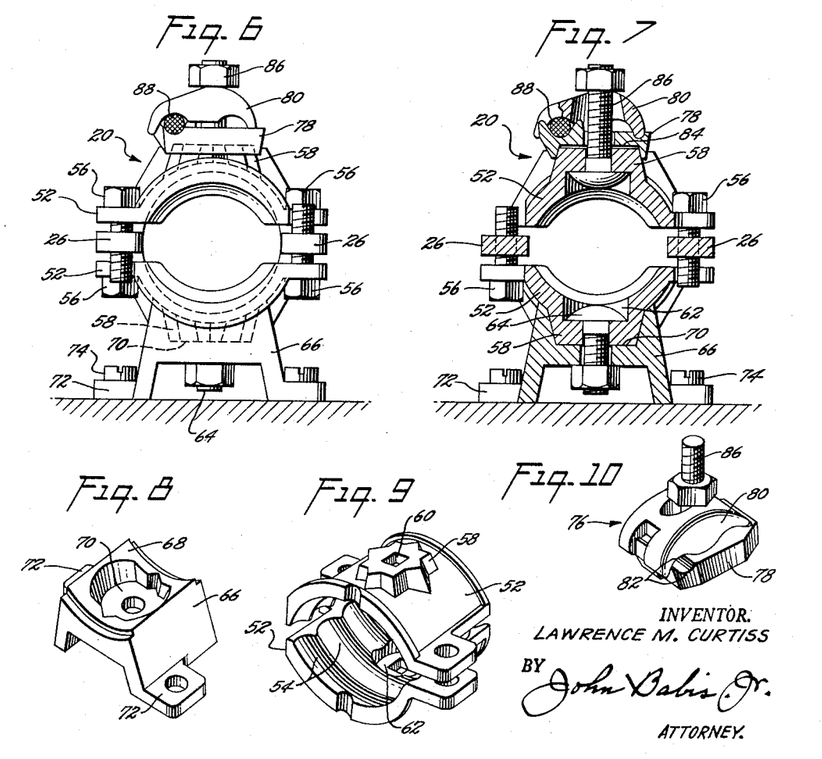
FIG. 6 is an end view of the body of the connector fitting and saddle clamps mounted thereon, as seen from the right in FIG. 4, including the complementary mounting bracket and grounding cable clamp as shown in FIG. 3.
FIG. 7 is a transverse sectional view of the connector fitting assembly shown in FIG. 6.
FIG. 8 is a perspective view of the complementary mounting bracket per se.
FIG. 9 is a similar view of the complementary saddle clamps per se.
FIG. 10 is a similar view of the complementary ground clamp per se.

As best shown in FIG. 5, the annular member 22 is further provided with a counterbore 30, extending from the free ends of the diametrically opposite arms 26 to a point short of its opposite end, whereby to provide an annular shoulder or stop 32 for limiting the intrusion of an end portion of an interlocked armor cable 34 therein. The screw-threaded portion of the annular member 22 includes a locknut 36 for securing the same in an apertured wall of an outlet box 38 or the like, and the inner periphery of its screw-threaded end with an inwardly inclined annular seat 40 adapted for receiving a complementary end portion of a rubber-like bushing 42, provided with a complementary metal slip-ring 44 on its opposite end face and adapted to be constricted about the circumference of an exposed end portion 46 of an interlocked armor cable 34 when extended through the annular member 22, as in FIG. 1, by means of a gland nut 48 secured on the screw-threaded end thereof, to provide a water-tight seal about the exposed cable end portion. In such applications where a watertight seal about an exposed end portion 46 of an armored cable is not necessary or desirable, as exemplified in the lower half of FIG. 1, a plastic insulating bushing 50 of approved form may be substituted for the gland nut 48.

Further in accordance with the invention, the externally screw-threaded annular sleeve 22, of the connector assembly 20, includes a pair of substantially semi-circular saddle clamps 52, each provided on its inner periphery with a complementary spiral groove 54, corresponding to the configuration of the outer periphery of the interlocked armor cable 34, whereby the saddle clamps 52 are selectively adapted to seat thereon and to be secured on the extended arms 26 of the annular sleeve 22, in floating relation to the axial center thereof, by means of suitable screw bolts 56, threaded in the openings 28, provided therefor in each of the arms 26, whereby the cable 34 is securely anchored in the connector assembly 20, centrally thereof and against relative endwise movement.

As best shown in FIG. 5, the crests of the spiral groove 54, formed in each of the saddle clamps 52, are so dimensioned as to seat on the interlocked armor of the cable 34, between its raised spiral convolutions, as at 34a, when the clamps 52 are secured thereon, whereby the interlocked armor is constricted on the cable conductors 46 enclosed therein to prevent endwise movement thereof relative to the interlocked armor as when such cable is supported in a vertical position.

Further in accordance with the invention, each of the saddle clamps 52 is provided centrally on its outer periphery with an integral, substantially star-shaped boss 58, having a rectangular clearance opening 60 therethrough, and an aligned clearance recess 62 in communication with the opening 60, formed in the inner periphery of each clamp 52, for the reception of the head of a screw bolt 64 therein with its shank extending through the clearance opening 60, whereby the annular sleeve 22, mounting a pair of saddle clamps 52 thereon in diametrically opposite relation, is adapted to be secured on a mounting bracket 66 having a complementary convex face 68 provided with an apertured recess 70 centrally thereof, for receiving the star-shaped boss 58 of the bottom saddle clamp 52 therein and the screw bolt 64 therethrough, the mounting bracket 66 being provided with a pair of apertured lugs 72 for securing such connecter assemblies 20, including an interlocked armor cable 32, on a fixed horizontal or vertical surface by means of suitable screws 74, as clearly shown in FIGS. 6, 7, 8 and 9.

Figure 3:
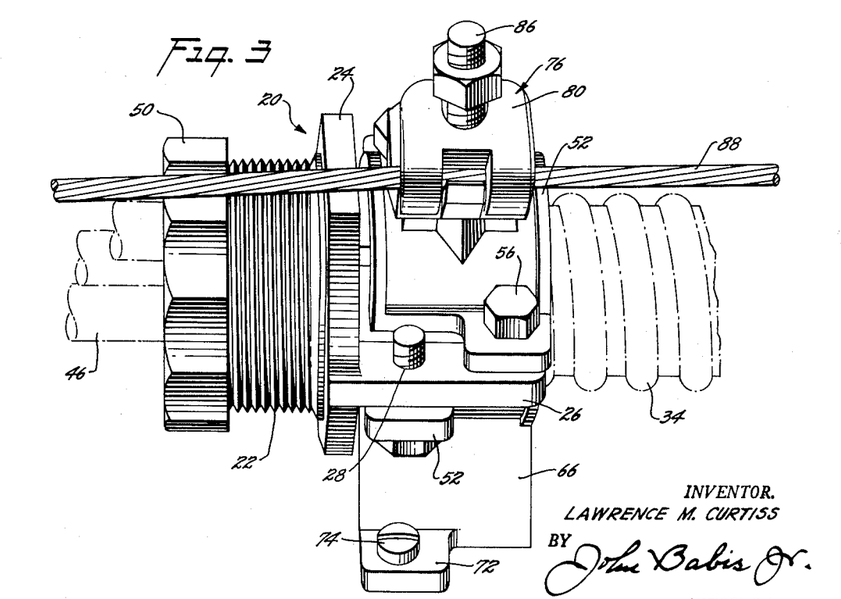
FIG. 3 is a similar view showing an adjustable, complementary grounding clamp secured on the top side of the connector fitting for receiving a grounding cable therethrough in spaced, parallel relation with the connector fitting and a cable end section supported by the connector fitting.
Figure 4:
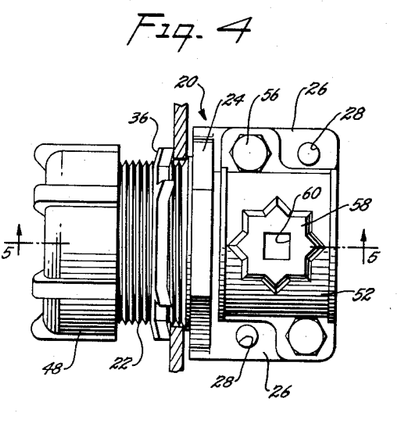
FIG. 4 is a top plan view of the connector fitting per se corresponding to that shown in the upper half of FIG. 1.
Figures 11, 12:
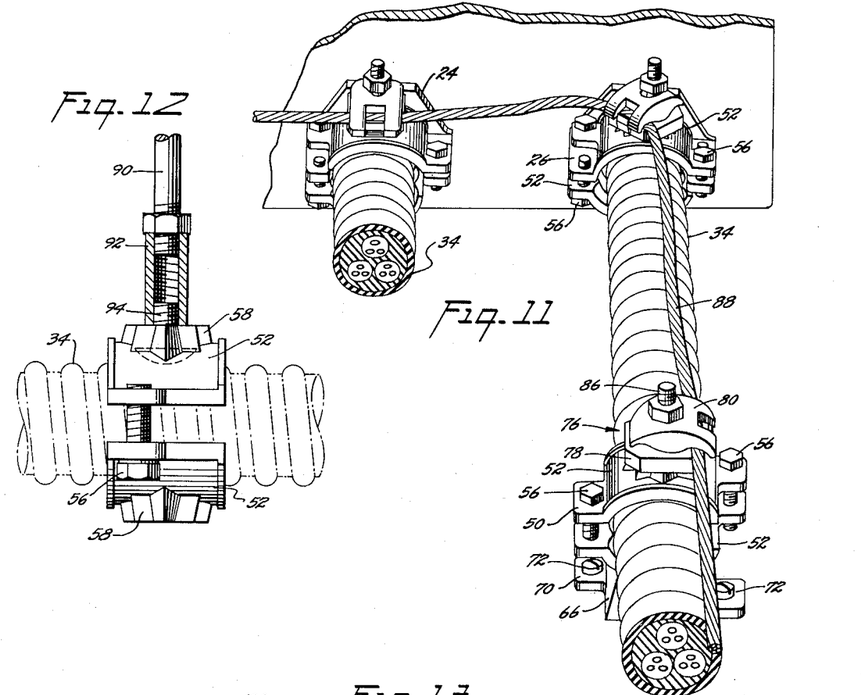
FIG. 11 is a fragmentary perspective view of a pair of interlocked armor cable sections as supported in spaced parallelism in a horizontal plane and terminated in an equipment enclosure by means of a plurality of the herein-described connector fittings, and as grounded by a single, continuous grounding cable secured along and across said cable sections and connector fittings.
FIG. 12 is a view in side elevation showing a pair of complementary saddle clamps as secured on an interlocked armor cable section and as supported overhead by means of a depending hanger rod having its free end secured to the upper one of said clamps.

Further in accordance with the invention, the cable connector assembly 20 also includes a grounding clamp 76 comprising an apertured base plate 78 and an apertured clamping plate 80, each provided with a semi-circular groove 82 in complementary relation for receiving a grounding conductor therebetween, the base plate 78 being provided with a complementary recess 84 in its underside for receiving the star-shaped boss 58 of the outer saddle clamp 52 therein, when positioned thereon in different positions of angular adjustment and secured thereto by means of a screw bolt 86 extending outwardly through the rectangular opening 60 in the boss 58 and through both elements 78 and 80 of the grounding clamp 76, and a lock nut secured thereon, whereby a continuous grounding conductor 88 may be secured along an interlocked armor cable installation in spaced parallelism therewith, across parallel lengths of such cable, and around bends therein, as exemplified in FIGS. 3 and 11, for example.

As exemplified in FIG. 12, interlocked armor cable 34 may also be suspended from elevated surfaces by means of the saddle clamps 52 per se, which are secured about sections of said cables at spaced points therealong, and suspended from a hanger rod 90, or the like, by securing an internally threaded sleeve 92 to the depending end of the hanger rod 90, and its opposite end to the top saddle clamp 52 by means of an upstanding screw bolt 94 extending therethrough.

Figures 13, 13A:
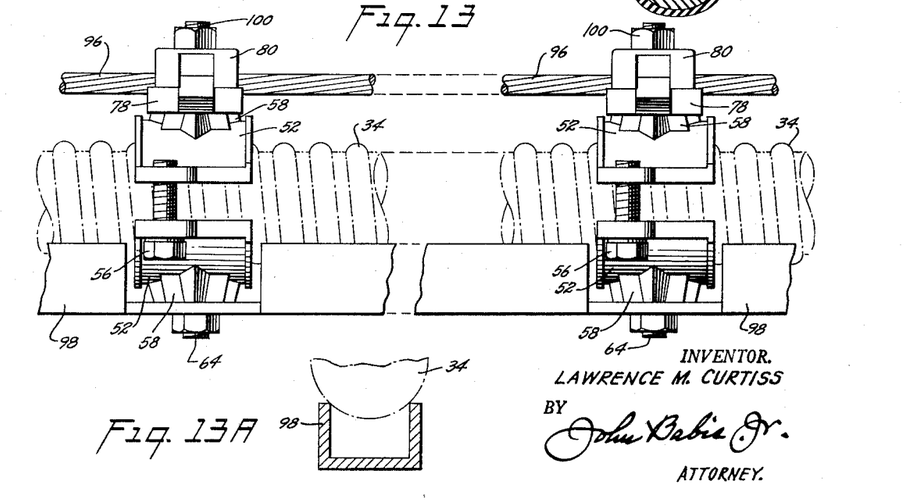
FIG. 13 is a view in side elevation illustration the manner in which the saddle clamps of the connector fitting may be utilized in conjunction with conventional hanger rods to suspend an interlocked amor cable section from an overhead support, and a channel bar secured on the under side of a series of aligned saddle clamps to obviate possible cable sag therebetween.
FIG. 13a is a transverse sectional view taken on the line X—X of FIG. 13, and showing the manner in which the side walls of the channel bar support the cable extending between spaced pairs of suspended saddle clamps.

Further in accordance with the invention, the saddle clamps 52 and the grounding clamp 76, or its equivalent, may be utilized in the manner illustrated in FIG. 13, for suspending an interlocked armor cable section 34 from a steel messenger cable 96, and sagging of the armored cable 34 between each pair of saddle clamps 52 prevented by means of a rigid U-shaped channel bar 98 secured lengthwise thereof to the bottom saddle clamp 52 of each pair by means of a screw bolt 100, extending through its star boss 58, and with the side walls of the channel bar 98 in engagement with the intervening cable as shown in FIG. 13a.

Figure 14:
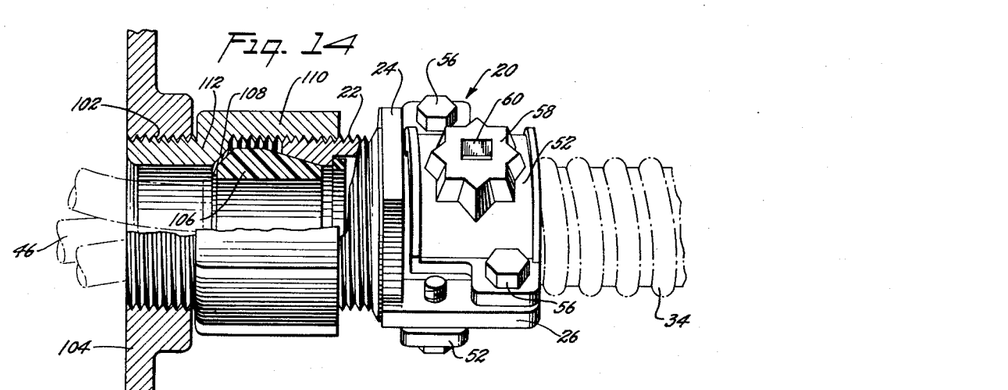
FIG. 14 is an elevational view partly in perspective illustrating the subject connector fitting secured to a fixed support with an end portion of an interlocked armor cable section secured therein and an end portion of its insulated conductors exposed and extending through the connector fitting, the free end of the connector fitting being provided with a gland nut which includes an externally threaded integral extension whereby the connector fitting is threaded in a suitable opening provided therefor in an equipment enclosure or box for terminating the exposed conductor end portions therein.

As shown in FIG. 14, the herein described cable connector assembly 20, is also utilizable for terminating an interlocked armor cable 34, in a screw-threaded aperture 102, in a wall of an equipment enclosure such as a switch box 104, for example, the connector assembly 20 including a rubber-like bushing 106 seated in the threaded end of the annular sleeve 22 of the connector assembly 20, with a slip-ring 108 seated on the opposite end of the bushing 106, and a gland nut 110 secured over the bushing on the threaded end of the annular sleeve 22 to provide a water-tight seal, the gland nut 110 having an externally threaded, annular extension 112 integral with its inwardly flanged outer end whereby the entire connector assembly is secured to the box 104 with the exposed conductor end portions 46 of the armored cable 34 extended thereinto.

Figure 15:
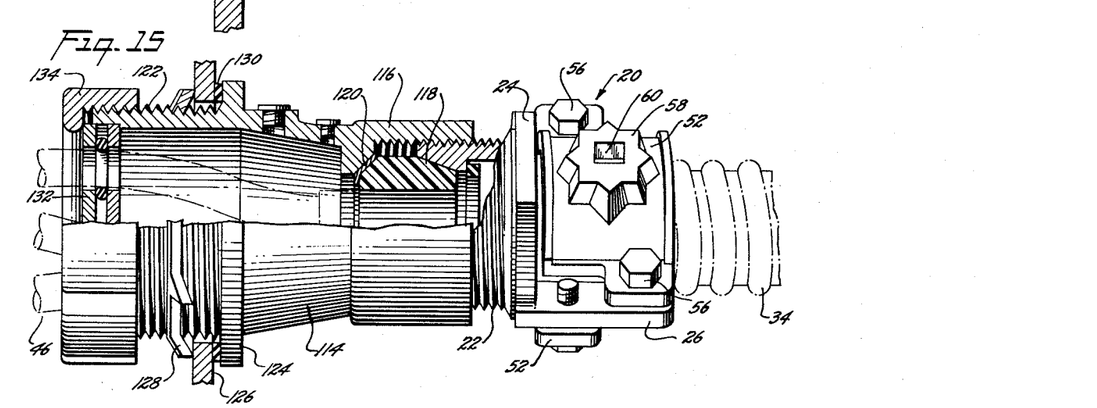
FIG. 15 is a side elevational view partly in perspective and illustrating the manner in which exposed insulated conductors of an interlocked armor cable, extending through the subject connector fitting, and a conventional pothead secured to the threaded free end thereof, are sealed in the pothead by mans of a suitable compound and the free end of the pothead provided with an insulating nut or bushing for retaining a non-metallic, apertured disc therein through which the ends of the exposed conductors extend in known manner.

An interlocked armor cable section 34 similarly supported at one end thereof by a connector assembly 20, as illustrated in FIG. 15, is terminated in a pothead 114, having its reduced, internally threaded end portion 116, connected to the threaded end portion of the sleeve portion 22 of the connector assembly 20, the reduced end 116 of the pothead 114 being formed internally to serve as a gland nut for compressing a rubber-like bushing 118, mounting a metal slip-ring 120 on one end face thereof, and with its opposite tapered end seated within the annular sleeve 22, to provide a fluid-tight connection therebetween. The larger opposite end of the pothead 114 is provided with an externally screw-threaded end portion 122 terminating in an annular shoulder 124, whereby it is adapted to be received in an apertured wall of an enclosure 126 and secured thereto by means of a lock nut 128, including a gasket 130, the intruded end opening of the pothead 114 being provided internally with suitable sealing rings 132 with the exposed conductor end portions 46 of the armored cable 34, extending therethrough and a plastic bushing 134 secured on the threaded end portion 122 thereof. The interior of the pothead 114 is subsequently loaded or packed with a suitable sealing compound through a screw-plugged filler opening 136, including a plugged vent opening 138, whereby the intruded cable end is sealed against the entrance of moisture.

Figure 16:
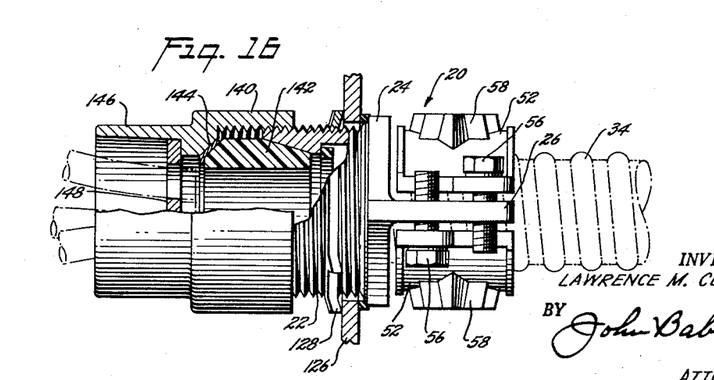
FIG. 16 is a view in side elevation showing the connector assembly per se, with a modified form of gland nut, including a rubber-like bushing and a slip ring therefor, secured on the externally threaded annular end thereof, and adapted to be mounted in an upstanding position with the extended open end of the gland nut filled with a sealing compound.

Further in accordance with the invention, the pothead 114 shown connected to the connector assembly 20, in FIG. 15, may be dispensed with and an open compound head 140 used in place thereof as shown in FIG. 16, wherein a gland nut 142, including a rubber-like bushing 144 and slip ring 146, is provided on its internally flanged end with an integral annular extension 148 having a slightly tapered inner periphery adapted for seating a suitable sealing ring 150 therein, and the extension therethrough of exposed conductor end portions of an interlocked armor cable, as in FIG. 15, the open end of the annular extension 148 being closed with a suitable compound, whereby to seal the same against the entrance of moisture.

Figure 17:
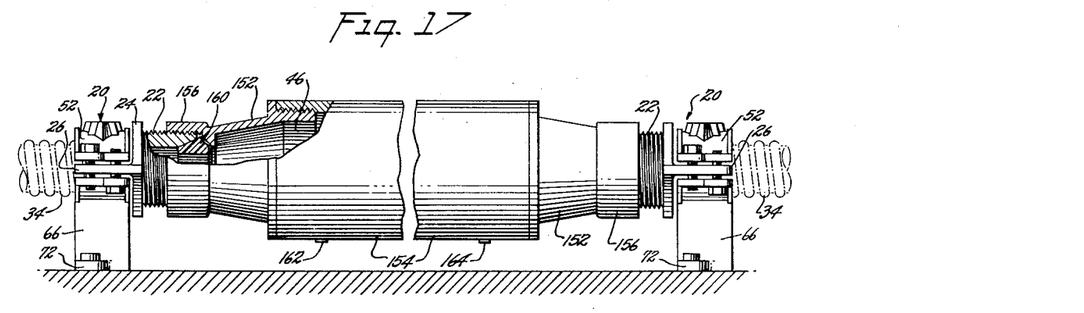
FIG. 17 is a view in elevation illustrating an arrangement in which a pair of interlocked armor cable end sections are spliced together and the splice enclosed within a tubular housing including a pothead threaded in each end thereof, and a connector assembly threaded in the free end of each pothead and subsequently secured on the spliced cable sections, each connector assembly being mounted on a fixed support adapted to be disposed in either a vertical or horizontal position.

Further in accordance with the invention and as illustrated in FIG. 17, a connector assembly 20 and a pothead 152 may also be combined for closing the respective internally screw-threaded ends of a suitable metal tube 154, adapted for enclosing a splice made between the exposed conductor end portions 46 of a pair of interlocked armor cable end portions 34. The larger end of the pothead 152 is threaded in the opposite ends of the tube 154, and the threaded end of the sleeve 22 of each connector assembly 20, threaded in the reduced end 156 of the potheads 152, the armored portion of each cable end 34 being secured in its correlated connector assembly 20 by the saddle clamps 52, as in the preceding figures, and mounted on a fixed surface in either a horizontal or vertical position by means of the mounting bracket 66 secured to each of the connector assemblies 20.

As described in connection with FIG. 15, the reduced end 156 of the pothead 152 is formed internally to serve as a gland nut for compressing a rubber-like bushing 158, having a metal slip-ring 160 on one end face thereof and its opposite tapered end seated within the annular sleeve 22 of the connector assembly 20, to provide a fluid-tight seal therebetween. The tubular splice enclosure 154 is provided with a screw-plugged filler opening 162, including a vent plug 164, whereby to load or fill the tube 154 with a suitable compound.

Figure 18:
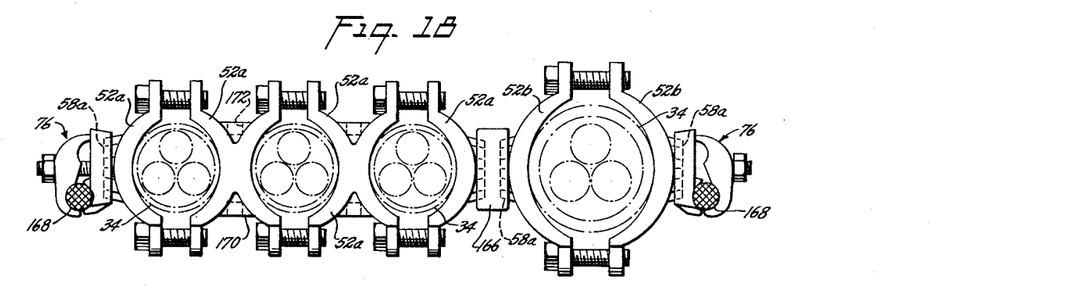
FIG. 18 is an end view of a modified form of the invention wherein an integral series of saddle clamps for one cable size, and an individual pair of saddle clamps for a different cable size, secured to one or both sides of the series saddle clamps in spaced alignment, normal thereto or in different positions of relative angular adjustment, may be suspended from a pair of messenger cables by means of a pair of grounding clamps secured to the outer sides of the assembled saddle clamps.
Figure 19:
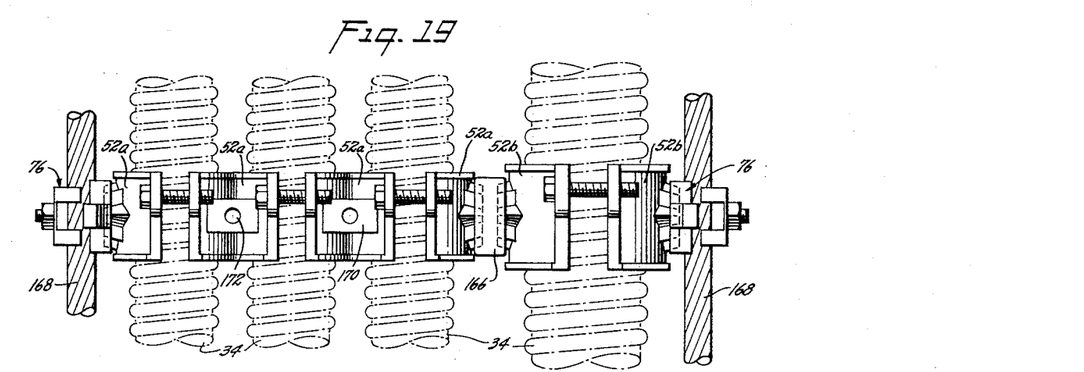
FIG. 19 is a bottom plan view of the assembly shown in FIG. 18.

Further in accordance with the invention, FIGS. 18 and 19 illustrate a modified cable support wherein a plurality of saddle clamps 52a are cast en bloc in side-by-side relation and which include individual saddle clamps 52a, at the respective ends thereof, for supporting a plurality of interlocked armor cables 34 of one size in spaced parallelism and a similar cable 34a of larger size secured between a pair of individual saddle clamps 52b of corresponding size and connected to one side of the series clamps 52a, either in parallelism or normal thereto by means of a clamp block 166 provided with a recess in each face thereof complementary to the star-shaped boss 58a, formed on the outer half of the series clamps 52a and individual clamps 52b, for connecting the same by means of suitable screw bolts therebetween.

A grounding clamp 76, as described in connection with the preceding figures, is secured on the star-shaped boss 58a of the outer one of the saddle clamps 52a and 52b, whereby the entire assembly of FIG. 18 is adapted to be secured to and between a pair of messenger cables 168 strung in parallelism for suspending the cables 34 and 34a therefrom.

The inner periphery of the saddle clamps 52a and 52b in FIG. 18 may be provided with a spiral groove complementary to the configuration of the outer periphery of the interlocked armor on the cables 34, or they may be provided in lieu thereof with a plurality of spaced, parallel serrations to prevent relative movement between the cables and the saddle clamps when secured thereon by means of the screw bolts 56.

As best shown in FIG. 19, a web 170 connecting the series saddle clamps 52a is of rectangular form and of sufficient depth to be provided with a screw-threaded opening 172 between each two halves thereof, whereby the cable supporting assembly shown may also be suspended from a ceiling by means of suitable hanger rods, the outer one of the saddle clamps 52b being provided with a suitable complementary lug (not shown) on its star-shaped boss 58a adapted for connecting a depending end of a hanger rod thereto.

While the invention has been illustrated and described with respect to a preferred embodiment thereof, it is to be expressly understood that various changes, modifications and rearrangement of parts of the connector assembly shown and described may be made therein without departing from the inventive concept underlying the same. Therefore, the invention is not to be limited except as is necessitated by the prior art and the scope of the appended claims.

I claim:

1. A connector fitting for terminating and supporting interlocked armor cable comprising, in combination, a sleeve, means for securing an end portion of an interlocked armor cable in one end of said sleeve comprising a cable clamp, a cable clamp support mounted on said sleeve and extending axially outwardly from said one end and means securing said clamp to said clamp support in floating relation transversely with respect to the axis of said sleeve, means secured to the other end of said sleeve for fluid sealing said sleeve around an exposed portion of said cable when received therethrough, and angularly adjustable means secured to said cable clamp in a position for adjustably mounting said connector on a fixed support.

2. A connector fitting as in claim 1 and including cooperable and complementary engageable seats on said cable clamp and said mounting means, said engageable seats being keyed to provide a plurality of fixed positions for selective engagement angularly disposed with respect to the plane of seating engagement, and means securing the same in selective angular relation.

3. A support fitting as in claim 2 and wherein said mounting means comprises a bracket and said engageable seats comprise a star-shaped recess in said bracket and a star-shaped boss on said cable clamp and said securing means comprises a member extending through said boss and into said bracket at said recess.

4. A support fitting as in claim 1 and including a grounding conductor clamp angularly adjustably mounted on said cable clamp in a predetermined position for securing a grounding conductor in spaced relation to said armor cable.

5. A connector fitting for terminating and supporting interlocked armor cable comprising, in combination, a sleeve, means for securing an end portion of an interlocked armor cable in one end of said sleeve comprising a cable clamp, a cable clamp support mounted on said sleeve and extending axially outwardly from said one end and means securing said clamp to said clamp support in floating relation transversely with respect to the axis of said sleeve, means secured to the other end of said sleeve for fluid sealing said sleeve around an exposed portion of said cable when received therethrough, and a ground conductor clamp angularly adjustably mounted on said cable clamp for securing a grounding conductor in spaced relation to said armor cable.

6. A support fitting as in claim 5 and including cooperable and complementary engageable seats on said cable clamp and said conductor clamp, said engageable seats being keyed to provide a plurality of fixed positions for selective engagement angularly displaced with respect to the plane of seating engagement, and means securing the same in selective angular relation.

7. A connector fitting for terminating and supporting interlocked armor cable comprising, in combination, a sleeve, means for securing an end portion of an interlocked armor cable in one end of said sleeve comprising a pair of saddle clamps, a cable clamp support mounted on said sleeve and extending axially outwardly from said one end, means securing said saddle clamp to said clamp support in diametrically opposed floating relation with respect to the axis of said sleeve, means for mounting said fitting on a fixed support, co-operable engageable seats on said mounting means and one of said clamps for engagement one with the other in secured relation, means securing said one of said clamps in fixed engagement with said mounting means, said seat on said one of said clamps being located a substantial distance from the ends thereof, and means secured to the other end of said sleeve for fluid sealing said sleeve around an exposed portion of said cable when received therethrough.

8. A connector fitting as in claim 7 in which said mounting means comprises a hanger rod and means adapted for seating on said clamp seat and securing said rod to said connector fitting.

9. A connector fitting as in claim 7 and including a ground conductor clamp angularly adjustably mounted on the other of said clamps for securing a grounding conductor in spaced relation to said armor cable.

10. A connector fitting for terminating and supporting interlocked armor cable comprising, in combination, a sleeve, an annular flange mounted on and extending radially outwardly of said sleeve at one end thereof, means for securing an end portion of an interlocked armor cable in the flanged end of said sleeve comprising a cable clamp, a cable clamp support mounted on said sleeve extending axially outwardly from the flanged end thereof and means for securing said clamp to said clamp support in floating relation transversely with respect to the axis of said sleeve, means removably secured to the other end of said sleeve for securing said sleeve in an apertured wall to seat in the aperture at said annular flange, and a ground conductor clamp angularly adjustably mounted on said cable clamp for securing a grounding conductor in spaced relation to said armor cable.

11. A connector fitting for terminating and supporting interlocked armor cable comprising, in combination, a sleeve, an annular flange mounted on and extending radially outwardly of said sleeve at one end thereof, means for securing an end portion of an interlocked armor cable in the flanged end of said sleeve comprising a cable clamp, a cable clamp support mounted on said sleeve extending axially outwardly from the flanged end thereof, means for securing said clamp to said clamp support in floating relation transversely with respect to the axis of said sleeve, means removably secured to the other end of said sleeve for securing said sleeve in an apertured wall to seat in the aperture at said annular flange, supplementary means for mounting said fitting on a fixed support, co-operable engageable seats on said supplementary mounting means and said cable clamp for engagement one with the other in secured relation, and means for securing the same in angular relation.

12. A connector fitting as in claim 11 and wherein said seats are selectively fixedly engageable a plurality of angular positions with respect to the plane of seating and wherein said securing means secures the same together in selective angular relation.

13. A support for interlocked armor cable comprising, in combination, a pair of diametrically opposed saddle clamps, means adjustably securing said saddle clamps together at their opposing ends, mounting means for said clamps comprising a bracket, co-operable engageable seats on said bracket and on one of said clamps for engagement one with the other in secured relation, said engageable seats comprising a star-shaped boss on said clamp and a star-shaped recess in said bracket, and securing means comprising a member extending through said boss and into said bracket at said recess securing the same in fixed engagement, said seat on said one of said clamps being located a substantial distance from the ends thereof.

14. A support for interlocked armor cable comprising, in combination, a pair of diametrically opposed saddle clamps, means adjustably securing said saddle clamps together at their opposing ends, mounting means for said clamps, co-operable engageable seats on said mounting means and on one of said clamps for engagement one with the other in secured relation, means securing the same in fixed engagement, said seat on said one of said clamps being located a substantial distance from the ends thereof, a ground wire clamp, co-operable and complementary engageable seats on said other saddle clamp and said wire clamp for engagement one with the other, said other saddle clamp and wire clamp seats being selectively fixedly engageable in a plurality of angular positions with respect to the plane of seating, and means securing said wire clamp and said other saddle clamp together in selective angular relation.

15. A support as in claim 14 and wherein the engageable seats of said wire clamp and said other saddle clamp comprise a star-shaped boss on said saddle clamp and a star-shaped recess in said wire clamp and wherein said second-named securing means comprises a member extending through said boss and into said wire clamp at said recess.

References Cited in the file of this patent

UNITED STATES PATENTS

| | | |
|---|---|---|
| 804,204 | Brown | Nov. 14, 1905 |
| 1,794,505 | Anderson | Mar. 3, 1931 |
| 1,945,488 | Lavarack et al. | Jan. 30, 1934 |
| 2,077,613 | Bondeson | Apr. 20, 1937 |
| 2,116,474 | Bondeson | May 3, 1938 |
| 2,197,728 | Lee | Apr. 16, 1940 |
| 2,490,253 | Buchanan | Dec. 6, 1949 |

FOREIGN PATENTS

| | | |
|---|---|---|
| 1,118,000 | France | Mar. 5, 1956 |